United States Patent [19]

Nomura

[11] Patent Number: 4,835,967
[45] Date of Patent: Jun. 6, 1989

[54] HYDRAULIC BOOSTER EQUIPPED WITH EMERGENCY ACCUMULATOR

[75] Inventor: Yoshihisa Nomura, Toyota, Japan

[73] Assignee: Toyota Jidosha Kabushiki Kaisha, Aichi, Japan

[21] Appl. No.: 212,223

[22] Filed: Jun. 27, 1988

[30] Foreign Application Priority Data

Jul. 7, 1987 [JP] Japan .................................. 62-168969

[51] Int. Cl.⁴ ...................... F16D 31/02; F15B 13/10; F15B 21/00
[52] U.S. Cl. ......................................... 60/404; 60/413; 91/5; 91/6; 91/391 R
[58] Field of Search ...................... 91/5, 6, 391 R, 374; 60/404, 413

[56] References Cited

U.S. PATENT DOCUMENTS

| | | | |
|---|---|---|---|
| 3,633,363 | 1/1972 | Larsen | 91/6 X |
| 3,733,968 | 5/1973 | Bach | 91/391 R |
| 3,998,128 | 12/1976 | Adachi | 91/391 R X |
| 4,135,435 | 1/1979 | Adachi | 91/6 |

OTHER PUBLICATIONS

S.A.E. Report 730536 (published in 1973).

*Primary Examiner*—Robert E. Garrett
*Assistant Examiner*—Mark A. Williamson
*Attorney, Agent, or Firm*—Oliff & Berridge

[57] ABSTRACT

A hydraulic booster equipped with an emergency accumulator, wherein reaction and power pistons are slidably fitted in a housing such that the two pistons define a power chamber therebetween. The booster includes a control valve having a normally closed power chamber passage formed therethrough so as to communicate with the power chamber, and a normally open passage connecting a pump and a reservoir. The valve is operated in response to an operation of the reaction piston, so as to restrict a fluid flow through the normally open passage from the pump toward the reservoir, thereby raising a pressure of the fluid delivered from the pump, and open the power chamber passage to apply the raised pressure to the power chamber. A pressure reducing device is provided in the power chamber passage, for reducing a fluid pressure in the power chamber passage and applying the reduced pressure to the power chamber, at least while a rate of fluid flow through the power chamber passage is higher than a preset limit. The emergency accumulator is connected between the pressure reducing device and the pump, for storing a portion of the fluid whose pressure is raised by the control valve, and supplying the power chamber with the stored fluid, in the event of a failure where a pressurized fluid cannot be fed from the pump.

12 Claims, 5 Drawing Sheets

FIG. 8 a hydraulic booster used for a hydraulic braking system for a motor vehicle or the like, and more particularly to such a hydraulic booster which is normally operated by an external hydraulic power source and which is equipped with an emergency accumuator whose pressure is applied to the booster upon failure or trouble of the external hydraulic power source.

HYDRAULIC BOOSTER EQUIPPED WITH EMERGENCY ACCUMULATOR

BACKGROUND OF THE INVENTION

1. Field of the Invention

The present invention relates in general to a hydraulic booster used for a hydraulically operated braking system for a motor vehicle or the like, and more particularly to such a hydraulic booster which is normally operated by an external hydraulic power source and which is equipped with an emergency accumuator whose pressure is applied to the booster upon failure or trouble of the external hydraulic power source.

2. Discussion of the Prior Art

The hydraulic booster generally includes a housing, a reaction piston, a power piston and a control valve. The reaction and power pistons are slidably fitted or received in the housing, such that a power chamber is defined between the reaction and power pistons. A power pressure in the power chamber is regulated by the control valve which is operated in response to an operation or movement of the reaction piston. The power piston is activated by the thus regulated power pressure. The pressure receiving area of the power piston is made smaller than that of the reaction piston, so that an output force of the power piston is greater than an operating force which acts on the reaction piston.

One known type of hydraulic booster is actuated by a working fluid which is normally recirculated by a pump through the system, under a relatively low pressure. While the reaction piston is at rest, the fluid delivered from the pump is merely passed through a normally open passage in the control valve, and returned to a reservoir of the system. As the reaction piston is operated, the control valve is operated so as to restrict a flow of the fluid through the control valve, whereby the fluid pressure produced by the pump is raised, and a power chamber passage formed through the control valve is opened so that the raised fluid pressure is applied to the power chamber through the opened chamber passage, to activate the power piston.

Where the hydraulic booster of the type described above is applied to a hydraulic braking system for an automotive vehicle, a hydraulic power source for a power steering device of the vehicle may be utilized as a power source for the hydraulic booster. This utilization is possible, since a common power steering device is adapted such that the fluid pumped up from the reservoir by the pump is returned to the reservoir through a power steering valve, under a low pressure, while the power steering device is in a non-operated position. However, in the event of a pressure failure of the hydraulic power source of the power steering device, the hydraulic booster cannot provide a normal boosting function, necessarily reducing the braking capacity of the braking system.

To avoid such a situation, it is proposed to use an emergency accumulator as disclosed in S. A. E. Report 730536 (published in 1973, from Society of Automotive Engineers, Incorporated). The proposed emergency accumulator is connected to the control valve through an accumulator passage provided with a check valve. The emergency accumulator is adapted to store a portion of the fluid whose pressure is elevated by the control valve. The stored pressurized fluid is supplied to the power chamber of the hydraulic booster to activate the power piston, in the event of a failure or trouble of a pump or other elements of the hydraulic power source of the hydraulic booster. Thus, the emergency accumulator enables the hydraulic booster to function to effect a normal boosting operation, until the fluid pressure in the accumulator is sufficiently high. The use of the emergency accumulator improves the reliability of the hydraulic braking system of the vehicle.

However, the known hydraulic booster equipped with the emergency accumulator indicated above suffers from a problem that the pressure of the fluid stored in the accumulator is equal to or lower than the maximum pressure level of the fluid which is supplied to the power chamber of the hydraulic booster during an operation of the booster. Although it is desirable that the fluid pressure in the accumulator be higher than the pressure of the fluid to be supplied to the power chamber, the upper limit of the pressure range of the fluid stored in the accumulator cannot exceed the fluid pressure applied to the power chamber. It is also noted that the fluid pressure in the accumulator is lowered as the stored fluid is fed to the hydraulic booster. For the above reasons, the hydraulic booster cannot operate to perform a required boosting function, in the event of a failure of its hydraulic power source, even where the emergency accumulator is provided.

SUMMARY OF THE INVENTION

It is therefore an object of the present invention to provide a hydraulic booster equipped with an emergency accumulator, which is capable of performing a required boosting function even when the booster is operated by a pressurized fluid stored in the emergency accumulator.

Another object of the invention is to provide such a hydraulic booster wherein the emergency accumulator is adapted to store the fluid whose pressure is higher than the pressure level required to normally activate the hydraulic booster.

The above objects may be achieved according to the principle of the present invention, which provides a hydraulic booster equipped with an emergency accumulator, comprising a housing, a reaction piston and a power piston which are fluid tightly and slidably fitted in the housing, such that the reaction and power pistons cooperate with the housing to define a power chamber, a control valve, and pressure reducing means provided in the power chamber passage.

The control valve has a normally closed power chamber passage formed therethrough so as to communicate with the power chamber, and a normally open passage connecting a pump and a reservoir. The control valve is operated in response to an operation of the reaction piston, so as to restrict a flow of a working fluid through the normally open passage from the pumnp toward the reservoir, thereby raising a pressure of the working fluid delivered from the pump, and open the power chamber passage to apply the raised pressure of the fluid to the power chamber. The pressure reducing means is adapted to reduce a pressure of the fluid in the power chamber passage and applying the thus reduced pressure to the power chamber, at least while a rate of flow of the fluid through the power chamber passage is higher than a predetermined limit. The emergency accumulator is connected between the pressure reduced means and the pump, for storing a portion of the working fluid whose pressure is raised by the control valve, and supplying the power chamber with the stored working fluid, in the event of a failure where a pressurized working fluid cannot be fed from the pump.

In the hydraulic booster equipped with the emergency accumulator constructed according to the invention as described above, the fluid pressure is raised by the control valve, but the fluid pressure applied to the power chamber is reduced by the pressure reducing means. The control valve operates to raise the fluid pressure so that the power pressure in the power chamber, i.e., the pressure obtained as a result of reduction of the raised pressure level is sufficient to activate the hydraulic booster so as to provide a required boosting function. Thus, the pressure on the upstream side of the pressure reducing means (on the side of the pump) is higher than the pressure on the downstream side of the pressure reducing means, i.e., the power pressure in the power chamber. This higher pressure obtained by the control valve is fed to the accumulator via a suitable accumulator passage, whereby the pressure of the fluid stored in the accumulator is higher than the fluid pressure necessary to activate the hydraulic booster. Therefore, the instant hydraulic booster can operate so as to provide an improved boosting function, when the booster is operated by the pressure from the emergency accumulator.

Since the above arrangement can be obtained by simply providing the pressure reducing means in the power chamber passage, the instant hydraulic booster with an emergency accumulator which provides the above operational advantage is available with a relatively small increase in the cost of manufacture.

In one form of the hydraulic booster of the present invention, the control valve is a spool valve which has a spool, and the power chamber passage includes a communication passage formed within the spool such that the pressure reducing means is disposed in the communication passage.

In another form of the invention, the pressure reducing means comprises a pressure reducing valve which inhibits a flow of the working fluid therethrough when a pressure differential across the valve is smaller than a predetermined value, and which permits the flow of the fluid therethrough when the pressure differential is greater than the predetermined value.

In the above form of the invention, the pressure reducing means may further comprises means for defining a restricted passage provided in parallel to the pressure reducing valve. The restricted passage is adapted to produce a pressure differential greater than the predetermined value, between opposite ends or upstream and downstream sides thereof, during at least a part of an operating period of the hydraulic booster. In this arrangement, the restricted passage maintains fluid communication between the upstream and downstream sides of the pressure reducing valve, even while the valve is in the closed position. This restricted passage therefore serves to prevent the pump from continuously delivering the pressurized fluid whose pressure is higher than that in the power chamber, after the pressure reducing valve is closed, i.e., after the fluid flow into power chamber is terminated. Thus, the instant arrangement eliminates unuseful consumption of energy due to otherwise required continuing high-load operation of the pump even after the fluid flow into the power chamber is stopped. However, the area of fluid flow through this restricted passage should be determined to be small enough to produce the pressure differential which is sufficient to open the pressure reducing valve for at least a portion of the operating period of the booster.

In the above arrangement, the pressure reducing means may further comprise a check valve connected in series with the restricted passage, so that the check valve permits a flow of the fluid in a direction toward the power chamber and inhibits a flow of the fluid in a direction opposite to the direction, while the pressure reducing valve inhibits a flow of the fluid from the power chamber. In this instance, the check valve and the pressure reducing valve prevent a leakage flow of the fluid from the power chamber through the restricted passage and power chamber passage.

Alternatively, the pressure reducing valve may include a valve member which is biased toward a closed position thereof in which the power chamber passage is closed by the valve member. In this case, the valve member may have the restricted passage.

In a further form of the hydraulic booster of the present invention, the control vavle is a spool valve which has a spool, and the hydraulic booster further comprises a normally closed shut-off valve which is opened by the spool when the spool is moved by a distance greater than normal due to the absence of a flow of the fluid into the power chamber even where the spool has opened the power chamber passage. The stored working fluid is supplied from the accumulator to the power chamber through the shut-off valve. In this case, the hydraulic booster may further comprise a damper disposed opposite to one of opposite ends of the spool. The damper normally prevents the spool to be moved to a valve opening position in which the shut-off valve is opened by the spool. However, when the spool acts on the damper for a time span longer than normal, the damper permits the spool to be moved to the valve opening position.

According to a still further form of the invention, the pressure reducing means comprises a restrictor disposed in the power chamber passage.

According to a yet further form of the invention, the control valve includes a primary spool and an auxiliary spool fitted in the primary spool. The primary spool has an upstream and a downstream land for restricting a flow of the working fluid through the normally open passage of the control valve, at respective upstream and downstream positions. The primary spool further has an auxiliary spool bore formed axially therethrough, and two by-pass passages for fluid communication of the auxiliary spool bore with respective upstream and downstream sides of one of the upstream and downstream lands. The auxiliary spool fitted in the auxiliary spool bore is biased by a spring so as to be normally held in a by-pass position thereof in which the two by-pass passages communicate with each other to permit a flow of the fluid from the pump toward the reservoir while by-passing the one of the upstream and downstream lands. The auxiliary spool is moved against a biasing action of the spring from the by-pass position to a restricting position thereof, due to a pressure difference between fluid pressures on opposite sides of the pressure reducing means. The auxiliary spool, when placed in the restricting position, disconnects the communication between the two by-pass passages, whereby the above-indicated one of the upstream and downstream lands also serve to restrict the fluid flow through the normally open passage.

In another form of the instant hydraulic booster, the power piston is formed with a rear support portion extending from a rear end face thereof, and the reaction piston is fluid tightly and slidably received in the rear support portion. The reaction piston has a first pair of engagement grooves formed in an outer circumferential surface thereof, and the rear support portion of the power piston has a pair of openings aligned with the first pair of engagement grooves, respectively. The rear support portion further has a second pair of engagement grooves which are formed in spaced-apart relation with the first pair of engagement grooves. The control valve has a spool which includes an end portion projecting into the power chamber, the end portion having a third pair of engagement grooves. In the present form of the invention, one of the first, second and third pairs of engagement grooves is formed in an axial direction of the reaction piston, while the other two pair of the engagement grooves are formed in a direction perpendicular to the axial direction. In the present case, the hydraulic booster further comprises a lever which includes a pair of opposed, generally elongate side plates, and a connecting portion connecting the opposed side plates. The opposed side plates have a first pair of engagement pins formed on a pair of opposed inner surfaces thereof so as to extend coaxially toward each other, a second pair of engagement pins formed on the opposed inner surfaces so as to extend coaxially toward each other, and a third pair of engagement pins formed on the opposed inner surfaces so as to extend coaxially toward each other. The first, second and third pairs of engagement pins are spaced apart from each other in an longitudinal direction of the opposed, generally elongate side plates, and are held in engagement with the first, second and third pairs of engagement grooves, respectively, such that the power piston, reaction piston and the spool of the control valve are linked so that the spool is axially moved as a result of an axial movement of the reaction piston relative to the power piston.

In a further form of the invention, the power piston is formed with a rear support portion extending from a rear end face thereof, and the reaction piston is fluid tightly and slidably received in the rear support portion. The reaction piston has a first pair of engagement pins formed on an outer circumferential surface thereof so as to extend coaxially in opposite directions perpendicular to an axial direction thereof, through respective openings which are formed through a wall thickness of the rear support portion of the power piston. The rear support portion of the power piston has a second pair of engagement pins formed on an outer circumferential surface thereof so as to extend coaxially in opposite directions perpendicular to the axial direction of the reaction piston. The second pair of engagement pins are formed parallel to the first pair of engagement pins and spaced apart from the first pair of engagement pins in a direction perpendicular to the axial direction. In this case, the hydraulic booster further comprises a lever which includes a pair of opposed, generally elongate side plates, and a connecting portion connecting the opposed side plates. The opposed, generally elongate side plates have a first pair of engagement grooves in a longitudinally intermediate portion thereof, and a second pair of engagement grooves each formed at one of opposite ends of the lever. One of the first and second pairs of engagement grooves is formed in a longitudinal direction of the generally elongate side plates, while the other of the first and second pairs being formed in a lateral direction substantially perpendicular to the longitudinal direction. The first pair of engagement pins of the reaction pistons engages the first pair of engagement grooves of the lever, while the second pair of engagement pins of the rear support portion of the power piston engages the second pair of engagement grooves, and the other end of the lever engages a spool of the control valve.

BRIEF DESCRIPTION OF THE DRAWINGS

The foregoing objects, features and advantages of the present invention will be better understood by reading the following detailed description of some presently preferred embodiments of the invention, when considered in connection with the accompanying drawings, in which.

DETAILED DESCRIPTION OF THE PREFERRED EMBODIMENTS

Figure 1:
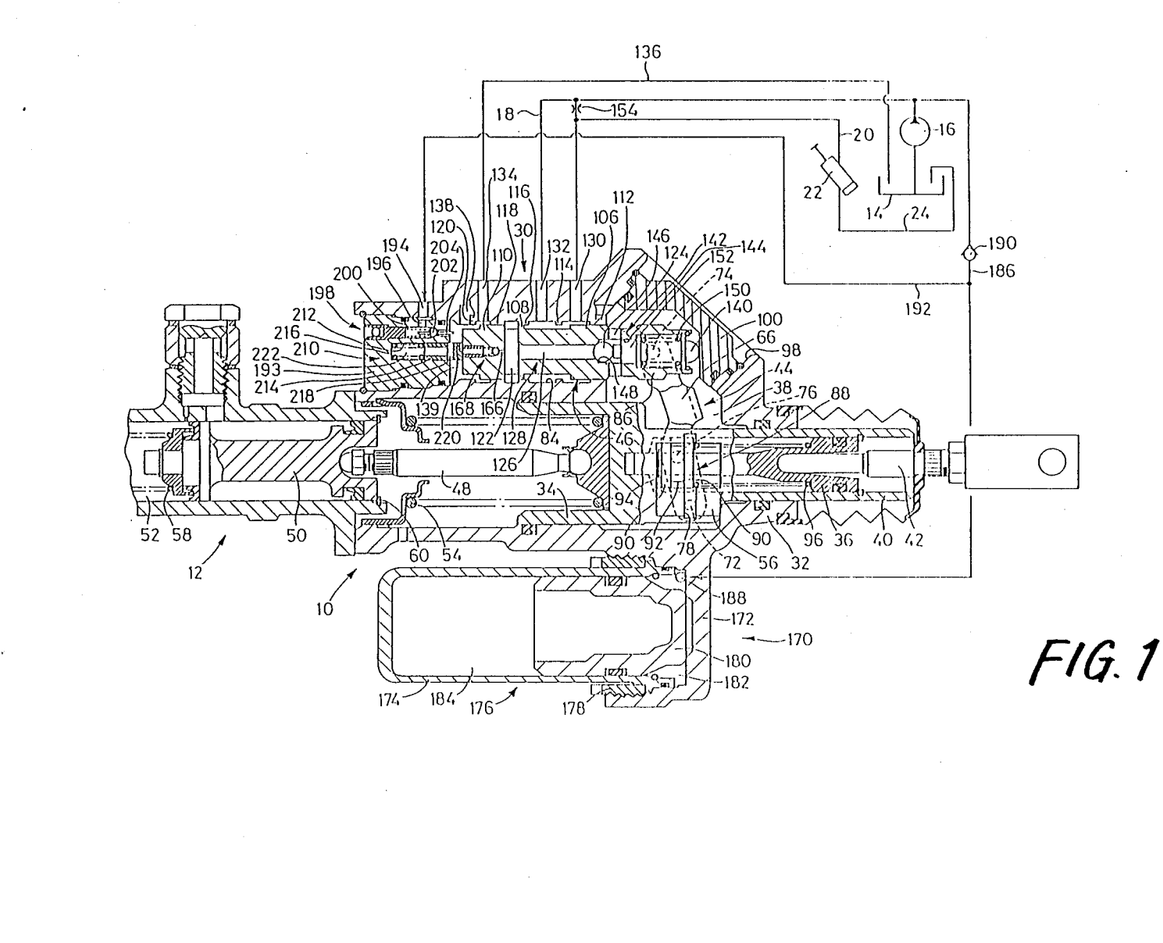
FIG. 1 is a front elevational view in cross section of one embodiment of a hydraulic booster equipped with an emergency accumulator.

Referring first to FIG. 1, there is shown the first embodiment of the hydraulic booster of the present invention, as applied to a hydraulically operated braking system for a motor vehicle, for boosting an operating force which is exerted on a brake pedal of the vehicle. In the figure, reference numeral 10 generally designates the hydraulic booster, while reference numeral 12 designates a master cylinder. The hydraulic booster 10 is operated by a hydraulic power source which is also used for a power steering device of the vehicle. The power steering device includes a steering valve 22 which is supplied with a working fluid is pressurized by a pump 16, which pumps up the fluid from a reservoir 14. The pressurized fluid delivered the pump 16 is fed to the steering valve 22 through fluid passages 18, 20, and the fluid supplied to the valve 22 is returned to the reservoir 14 through a fluid passage 24. The steering valve 22 is of an open-center type which permits a free flow of the working fluid therethrough when the steering device is placed in its neutral position, i.e., when the steering wheel of the vehicle is not operated. Normally, the working fluid flows through a control valve 30 of the hydraulic booster 10, and through the steering valve 22, under a relatively low pressure.

The hydraulic booster 10 includes a housing 32, and a power piston 34 and a reaction piston 36 which are fluid tightly and slidably fitted in the housing 32, such that the two pistons 34, 36 are coaxial with each other. The two pistons 34, 36 cooperate with the housing 32, to define a power chamber 38 therebetween. In the present embodiment, the power piston 34 is formed with a rear support portion in the form of a cylindrical portion 40, which extends from the rear end face of the power piston 34, through a rear wall of the housing 32. The free end of the cylindrical portion 40 is exposed to the atmosphere. The reaction piston 36 is fluid tightly and slidably received in the rear cylindrical portion 40 of the power piston 34. However, the cylindrical portion 40 is not essential. Namely, the reaction piston 36 may be fitted directly in the appropriate portion of the housing 32.

The reaction piston 36 is activated through an input rod 42 by a brake pedal (not shown) provided on the vehicle, such that a reaction force of the reaction piston 36 is imparted to the brake pedal. The reaction force varies depending upon a fluid pressure in the power chamber 38. A relative axial movement between the power and reaction pistons 34, 36 is converted by a motion converting mechanism 44 into an axial movement of a spool 46 of the control valve 30, whereby a power pressure in the power chamber 38 is controlled by the control valve 30. The power piston 34 is advanced by the power pressure, and an advancing force of the power piston 34 is transmitted to a presser piston 50 via an output rod 48. Consequently, a braking pressure is produce in a pressure chamber 52 formed in front of the presser piston 50. The produced braking pressure is applied to wheel brake cylinders (not shown) of the vehicle. The power piston 34 is biased by a return spring 54 toward its retracted position. This retracted position is determined by an abutting contact of a stopper projection 56 of the piston 34 with an inner surface of the rear wall of the housing 32. Similarly, the presser piston 50 is biased by a return spring 58 toward its retracted position, which is determined by a stop in the form of a retaining ring 60. It will be understood that the power piston 34 itself may function as a presser piston.

Figure 2:
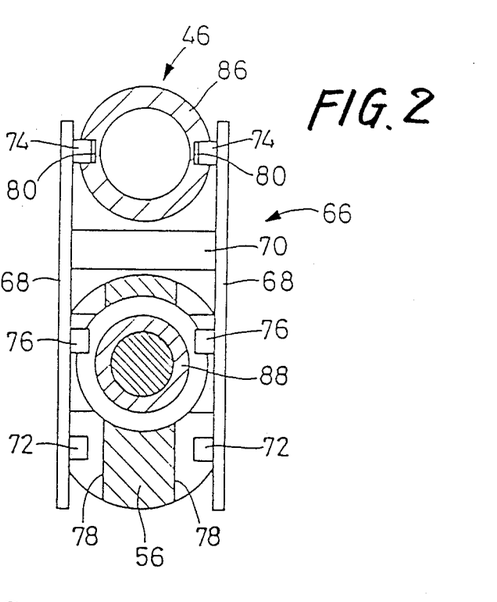
FIG. 2 is a side elevational view in cross section of a motion converting mechanism of the booster of FIG. 1.

The motion converting mechanism 44 includes a lever 66. This lever 66 has a pair of opposed, generally elongate side plates 68 which are connected to each other by a connecting portion 70, as indicated in FIG. 2. On the opposed inner surfaces of the opposed side plates 68, there are formed three pairs of engagement pins 72, 74, 76 such that the pins of each pair extend coaxially toward each other. The two pairs of engagement pins 72, 74 are disposed on opposite end portions of the side plates 68, while the pair of engagement pins 76 are disposed in a longitudinally intermediate portion of the side plate 68. That is, the three pairs of engagement pins 72, 74, 76 are spaced apart from each other in the longitudinal direction of the lever 66. The engagement pins 72 engage a pair of engagement grooves 78 which are formed in opposite side surfaces of the stopper projection 56 of the power piston 34, in a direction perpendicular to the axis of the power piston 34. The engagement pins 74 engage a pair of engagement grooves 80 which are formed in the spool 46 of the control valve 30. Described more specifically, the spool 46 is slidably fitted in a valve bore 84 formed in the housing 32, and has an end portion which projects into the power chamber 38, as shown in FIG. 1. The projecting end portion of the spool 46 has a large-diameter part 86. The pair of engagement grooves 80 engaging the engagement pins 74 indicated above are formed in the large-diameter part 86, in the axial direction of the spool 46, from the rear end toward the middle of the large-diameter part 86. The engagement pins 76 formed on the intermediate portion of the lever 66 are held in engagement with an engagement member 88 which is fitted on the reaction piston 36. As shown in FIG. 1, the engagement member 88 is a cylindrical member provided at its opposite axial ends with a pair of radially outward flanges 90. The engagement pins 76 engage an engagement groove 92 defined between the pair of outward flanges 90. The engagement member 88 is slidably fitted on a front end portion of the reaction piston 36, and is biased by a spring 96 such that the engagement member 88 is forced against a retaining ring 94. According to this arrangement, the engagement member 88 is normally moved together with the reaction piston 36. However, a force which is exerted from the engagement pins 76 to the engagement member 88 in the rearward direction exceeds a set load of the spring 96, the engagement member 88 is moved in the rearward direction relative to the reaction piston 36.

Upon installation of the lever 66, the lever 66 is inserted into the housing 32, through an opening 98 formed in the housing 32, and positioned relative to the power piston 34, reaction piston 36 and spool 46, in the manner described above. With the lever 66 installed in position, the opening 98 is closed by a plug 100.

The spool 46 of the control valve 30 has lands 106, 108 and 110, while the valve bore 84 is formed with lands 112, 114, 116, 118 and 120. The spool 46 has a radial communication passage 122 which is open between the lands 108 and 110, a radial communication passage 124 formed in the end portion, and an axial communication passage 126 which connects the two radial communication passages 122, 124. These communication passages 122, 124, 126 constitute a power chamber passage indicated at 128. The housing 32 has a port 130 open between the lands 112 and 114, a port 132 open between the lands 114 and 116, and a port 134 open between the lands 118 and 120. The ports 130 and 132 are connected to the fluid passages 20 and 18, respectively, while the port 134 is connected to the reservoir 14 through a fluid passage 136.

The spool 46 is normally placed in its retracted position, with a stopper member 140 thereof held in abutting contact with an inner surface of the plug 100. In this retracted position, the lands 106 and 114 are spaced apart from each other, and the lands 108 and 116 are placed in abutting contact with each other. Further, the ports 130 and 132 communicate with each other, while the port 132 is disconnected from the power chamber passage 128. In this condition, therefore, the working fluid supplied from the pump 16 to the port 132 through the fluid passage 18 is fed to the steering valve 22 through a clearance between the lands 106, 114, and through the port 130 and fluid passage 20. The fluid supplied to the valve 20 is returned to the reservoir 14 through the fluid passage 24. With the spool 46 held in its retracted position, the lands 100 and 120 are also spaced apart from each other, and the power chamber 38 is in communication with the reservoir 14, through a communication passage 138, a fluid chamber 139, the port 134 and a fluid passage 136.

When the spool 46 is moved to the left as seen in FIG. 1, the land 110 first comes into contact with the land 120, to disconnect the power chamber 38 from the reservoir 14. Then, the land 108 is moved away from the land 116, whereby the port 132 is brought into communication with the power chamber passage 128 in the spool 46. Simultaneously, the land 106 approaches the land 114, thereby restricting a rate of flow of the fluid through the control valve 30, in the direction from the pump 16 toward the reservoir 14, whereby the fluid pressure in the port 132 is accordingly raised, As a result, a part of the pressurized fluid is fed into the power chamber 38 thorugh a clearance between the spaced-apart lands 108, 116 and through the power chamber passage 128. Between the axial and radial communication passages 126, 124 of the power chamber passage 128, there is disposed a pressure reducing valve 142. Described more specifically, a valve bore 144 is formed through the rear end portion of the spool 46, extending from the rear end face up to the rear end of the axial communication passage 126. In this valve bore 144, there are disposed a valving member in the form of a ball 146, a spring 150 for biasing the ball 146 against a valve seat 148, and a spring retainer 152. These members 146, 148, 150, 152 constitute the pressure reducing valve 142, which is adapted to reduce the pressure of the fluid which is introduced into the power chamber 38. The fluid passages 18 and 20 are connected to each other by a restricted passage 154 provided in parallel to the control valve 30, in order to assure a required minimum amount of supply of the fluid to the steering valve 22, even when the land 106 is positioned close to the land 114.

In the front end portion of the spool 46, there is formed a fluid passage which consists of a small-diameter hole 166 and a check valve 168, for fluid communication between the power chamber passage 128 and the fluid chamber 139. The small-diameter hole 166 is provided to permit a flow of fluid from the power chamber passage 128 into the fluid chamber 139, while providing a resistance to the fluid flow. The check valve 168 prevents a fluid flow in a direction from the fluid chamber 139 to the power fluid chamber 128.

The hydraulic booster 10 is equipped with an emergency accumulator 170. This accumulator 170 has a housing 176 which consists of a first member 172 and a second member 174. The first member 172 is a cylindrical cup-shaped member formed as an integral part of the housing 32 of the hydraulic booster 10, while the second member 174 is also a cylindrical member which is closed and open at its opposite ends, respectively. These first and second members 172, 174 are fixed to each other by an annular threaded member 178 such that the open end portion of the second member 174 is fitted in the first member 172, so as to form a housing 176. In this housing 176, there is fluid tightly and slidably received a piston 180 such that an accumulator chamber 182 and a gas chamber 184 are formed on opposite sides of the piston 180. The gas chamber 184 is pre-charged with a suitable high-pressure charging gas such as a nitrogen gas, so that the piston 180 is biased toward its advanced position (in the right direction as seen in FIG. 1).

An accumulator passage 186 is branched from the fluid passage 18 which connects the pump 16 and the control valve 30. The accumulator passage 186 is connected to a port 188 of the accumulator chamber 182 of the accumulator 170. In the accumulator passage 186, there is provided a check valve 190 which permits a fluid flow in a direction from the pump 16 toward the accumulator 170, but which inhibits a fluid flow in the reverse direction.

A supply passage 192 is branched from the accumulator passage 186, at a point between the check valve 190 and the accumulator 170. This supply passage 192 is connected to the port 194 of the fluid chamber 139 indicated above. This port 194 is connected to the fluid chamber 139 through a communication passage 196 which is formed through a plug 193. In this communication passage 196, there is provided a shut-off valve 198 which is a normally closed type wherein a valving member 202 is biased toward a valve seat by a spring 200. The valving member 202 has a plunger 204 which is adapted to be pushed by the spool 46, to open the shut-off valve 198 so that the fluid supplied from the accumulator 170 is fed into the fluid chamber 139.

On the end face of the plug 193 opposite to the spool 46, there is provided a damper 210 for preventing a rapid movement of the spool 46 toward the shut-off valve 198. This damper 210 includes a piston 214 fitted in a blind hole 212 formed in the plug 193. The piston 214 is biased by a spring 216 in a direction causing the piston to project out of the blind hole 212. The piston 214 has a T-shaped passage 218 and an orifice 220. When the piston 214 is held in its retracted position under the biasing action of the spring 216, in abutting contact with the spool 46 placed in its retracted position, the fluid passage 218 is open in the fluid chamber 139. The fluid passage 218 is colsed when the piston 214 is moved by a certain distance (corresponding to a distance of movement of the spool 46 that causes the land 108 to be spaced slightly apart from the land 116) from the retracted position. After the fluid passage 218 is closed, the fluid flow into the fluid chamber 139 from a fluid chamber 222 in the blind hole 212 is permitted only through the orifice 220, whereby the rate of movement of the spool 46 is lowered.

Normally, the power piston 34, reaction piston 36 and spool 46 of the instant hydraulic booster 10 are placed in their retracted positions as indicated in FIG. 1, and the power chamber 38 is disconnected from the port 132 or pump 16, but in communication with the port 134 or reservoir 14. Further, the land 106 is spaced apart from the land 114 by a sufficient distance, whereby the fluid pumped from the reservoir 14 by the pump 16 is returned to the reservoir 14, while flowing through the control valve 30 and steering valve 22 under a relatively low pressure.

When the reaction piston 36 is advanced by the input rod 42 as a result of depression of the brake pedal of the vehicle, the engagement pins 76 of the lever 66 are moved to the left as seen in FIG. 1. Since the power piston remains in its retracted position under the biasing action of the return spring 54, the lever 66 is pivoted about the engagement pins 72, whereby the spool 46 is moved by the engagement pins 74. Described differently, an advancing movement of the reaction piston 36 relative to the power piston 34 is converted by the motion converting mechanism 44 into an advancing movement of the spool 46.

With the spool 46 advanced, the land 110 first comes into contact with the land 120, to disconnect the power chamber 38 from the reservoir 14. Then, the land 108 is spaced apart from the land 116, whereby the power chamber passage 128 is brought into communication with the port 132, and the land 106 comes closer to the land 114 whereby the fluid flow through the control valve 30 is restricted, with a result of raising the fluid pressure in the port 132. Consequently, the working fluid flows through the power chamber passage 128 into the power chamber 38, and the power piston 34 is advanced. However, the working fluid flowing into the power chamber 38 is reduced at a given ratio by the pressure reducing valve 142.

Figure 3:
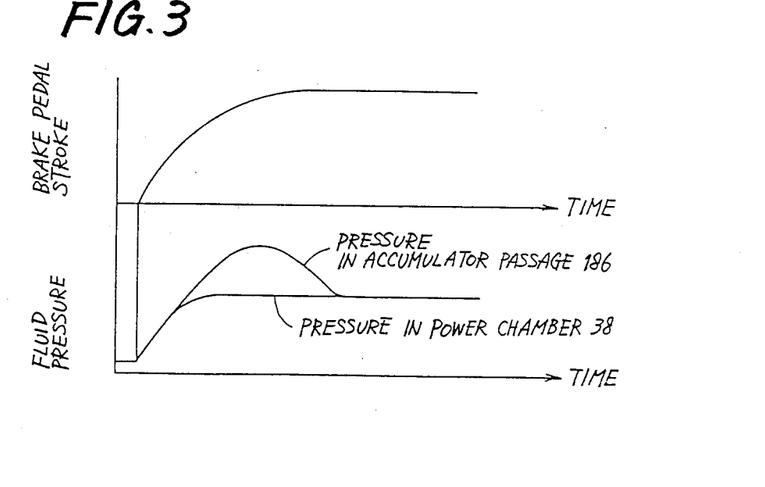
FIG. 3 is a graph illustrating changes in fluid pressures in a power chamber and an accumulator passage of the booster, during an operation of the booster.

Described more specifically, the fluid pressures in the port 132 and in the accumulator passage 186 are made higher than that in the power chamber 38, as indicated in FIG. 3. This higher fluid pressure in the accumulator passage 186 is maintained while the fluid is flowing into the power chamber 38 during an advancing movement of the power piston 34. When the power piston 34 is slightly advanced relative to the reaction piston 36 with the fluid pressure in the power chamber 38 raised to a predetermined level after the brake pedal depression is stopped, the spool 46 is retracted, and the communication between the port 132 and the power chamber passage 128 is substantially disconnected, whereby the pressure reducing valve 142 is closed and the fluid flow into the power chamber 38 is substantially stopped (with a continuing small supply of the fluid in order to compensate for a leakage flow), and the advancing movement of the power piston 34 is brought to a stop. In the meantime, the land 106 is spaced apart from the land 114. In consequence, the fluid pressures in the port 132 and accumulator passage 186 are lowered, as indicated in FIG. 3, to the same level as that in the power chamber 38, since the port 132 and the power chamber 38 continue to communicate with each other to a limited extent, through a small clearance between the lands 108 and 116, power chamber passage 128, small-diameter hole 166, check valve 168, fluid chamber 139 and communication passage 138.

When the depression of the brake pedal is released, the reaction piston 36 is retracted relative to the power piston 34, and the spool 46 is accordingly retracted, whereby the land 108 comes into contact with the land 116 while the land 110 is spaced apart from the land 120. Thus, the power chamber 38 is disconnected from the pump 16 and is brought into communication with the reservoir 14. As a result, the working fluid is discharged from the power chamber 38 and the power piston 34 is retracted.

When the fluid pressure in the port 132 rises above the pressure in the accumulator chamber 182 of the accumulator 170 during an operation of the hydraulic booster 10 as described above, the fluid is fed through the accumulator passage 186 into the accumulator chamber 182, and the raised pressure of the fluid flowing into the chamber 182 pushes the piston 180 toward its retracted position against the pressure in the gas chamber 184. The accumulator chamber 182 of the accumulator 170 stores the fluid whose pressure level is substantially equal to the maximum value indicated by the peak of the pressure curve of the accumulator passage 186 in FIG. 3.

The check valve 190 prevents a flow of the stored fluid from the accumulator 170 back to the pump 16, while the shut-off valve 198 prevents a flow of the stored fluid into the fluid chamber 139 through the supply passage 192. Although the spool 46 is advanced by a depression of the brake pedal, the rate of movement of the spool 46 after a predetermined distance of advancement thereof is reduced by the damper 210. Therefore, an abrupt operation of the brake pedal will not cause the spool 46 to open the shut-off valve 198. Thus, the working fluid once stored in the accumulator 170 can remain stored for emergency applications.

In the event that a flow of the fluid through the control valve 30 cannot be obtained due to a failure or trouble of the pump 16 or related components, the shut-off valve 198 is opened by the spool 46, and the fluid stored in the accumulator 170 is supplied to the power chamber 38 through the shut-off valve 198, fluid chamber 139 and communication passage 138. While no fluid flow exists in the control valve 30, an advancing movement of the spool 46 as a result of an operation of the brake pedal will not cause an increase in the fluid pressure in the port 132 or in the power chamber 38, and therefore the power piston 34 will not be advanced. Accordingly, the spool 46 is advanced against the action of the damper 210, by a distance greater than usual, whereby the shut-off valve 198 is opened. As a result, the power pressure in the power chamber 38 is sufficiently raised, and the power piston 34 is activated in an ordinary manner, causing the master cylinder 12 to produce a sufficiently high braking pressure in the pressure chamber 52, by which the wheel brake cylinders of the vehicle can be normally operated. In this instance, the check valve 168 prevents a leakage flow of the fluid toward the port 132 through the power chamber passage 128 and the clearance between the lands 108, 116.

It will be understood that the amount of the fluid that can be supplied from the accumulator 170 is limited, and the absence of a flow of the fluid from the accumulator 170 through the control valve 30 should preferably be detected by suitable means, in order to inform the vehicle driver of this fact.

If the brake pedal is depressed while the accumulator 170 is practically exhausted, the reaction piston 36 abuts on the power piston 34, and an operating force acting on the brake pedal is mechanically imparted to the presser piston 50. In this case, therefore, the master cylinder 12 functions like a master cylinder which is not equipped with the hydraulic booster 10. The abutting contact of the reaction piston 36 on the power piston 34 is permitted by an axial movement of the engagement member 88 relative to the reaction piston 36 against the biasing force of the spring 96. Namely, the axial movement of the engagement member 88 prevents the lever 66 from inhibiting an advancing movement of the reaction piston 36 relative to the power piston 34.

Figure 4:
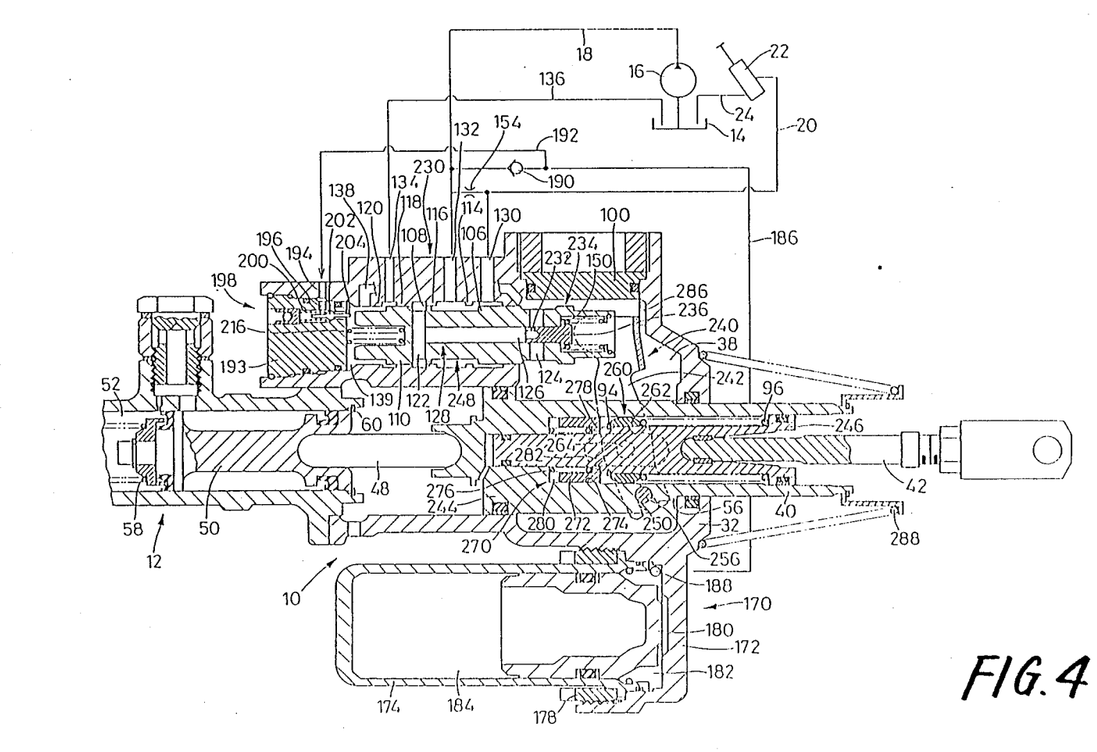
FIG. 4 is a front elevational view in cross section of another embodiment of the hydraulic booster of the invention.

Referring next to FIG. 4, there is illustrated another embodiment of the hydraulic booster of the present invention, which is different from the preceding embodiment, primarily in connection with the control valve and motion converting mechanism. The other portions of the instant modified embodiment are substantially similar to the corresponding portions of the preceding embodiment. The same reference numerals as used in the preceding embodiment will be used to identify the similar components, and redundant description of these components will not be provided. The following description refers only to those components of the instant embodiment which are different from the corresponding components of the preceding embodiment.

The control valve 230 of the present embodiment is not provided with the damper 210 used in the preceding embodiment. Further, a valve member 236 of the pressure reducing valve 234 of the instant embodiment has a small-diameter hole 232 which corresponds to the small-diameter hole 166 provided in the preceding embodiment. Unlike the pressure reducing valve 142 of the preceding embodiment, the instant pressure reducing valve 234 neither is a seat valve having anti-leakage provisions, nor is provided with a check valve like the check valve 168 provided adjacent to the small-diameter hole 166. According to the instant arrangement, therefore, the fluid delivered from the accumulator 170 to the hydraulic booster 10 may leak into the port 132, through the clearance of the pressure reducing valve 234, small-diameter hole 232, power chamber passage 128, and the clearance between the lands 108 and 116.

However, this leakage flow does not practically matter, since the leakage is substantially prevented by the pump 16, while the fluid passage 18 is intact.

Figures 5, 6:
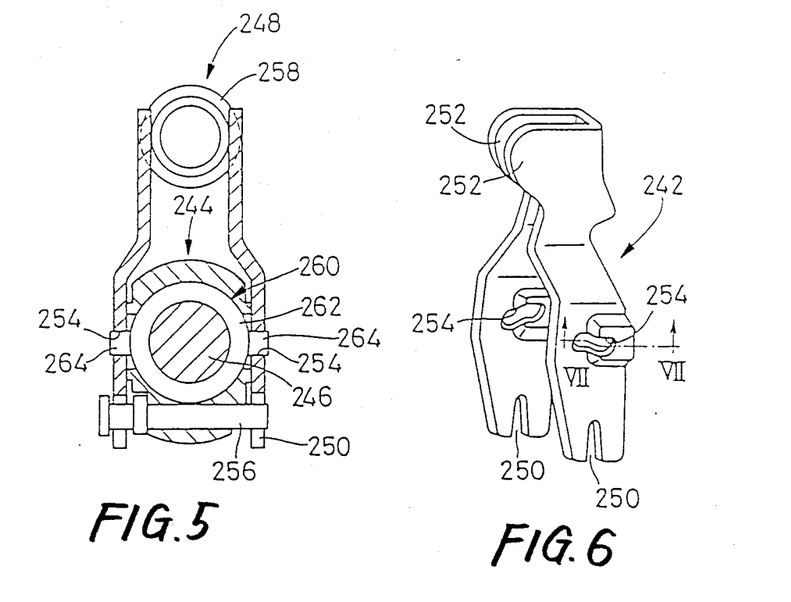
FIG. 5 is a side elevational view of a motion converting mechanism of the booster of FIG. 4.
FIG. 6 is a perspective view of a lever used for the motion converting mechanism of FIG. 5.
Figure 7:
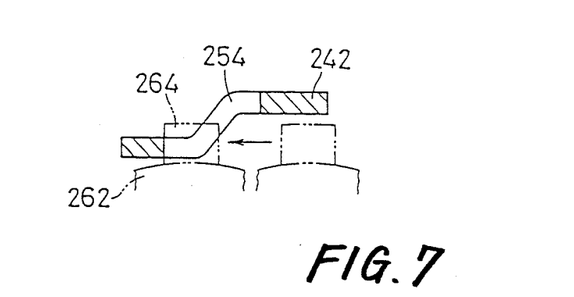
FIG. 7 is a cross sectional view taken along lines VII—VII of FIG. 6.

The motion converting mechanism 240 of the present embodiment is different from the mechanism 44 of the preceding embodiment, primarily in the manner of engagement of a lever 242 with respect to a reaction piston 246 and a spool 248. Described more specifically referring to FIGS. 5 and 6, the generally elongate lever 242 has a pair of engagement notches 250 at one of opposite ends thereof, a pair of abutment tabs 252 at the other end, and a pair of engagement holes 254 in a longitudinally intermediate portion thereof. The engagement notches 250 are formed in the longitudinal direction of the lever 242, and the engagement holes 254 are formed in the lateral direction of the lever 242, i.e., formed in a direction perpendicular to the longitudinal direction. As shown in FIG. 5, the engagement notches 250, abutment tabs 252 and engagement holes 254 are held in engagement with the power piston 244, reaction piston 246 and spool 248, respectively. The power piston 244 has an engagement pin 256 attached thereto, and this pin 256 engages the engagement notches 250. The spool 248 of the control valve 230 has a shoulder face 258, so that the abutment tabs 252 of the lever 242 are held in abutting contact with the shoulder face 258. The engagement holes 254 formed in the intermediate portion of the lever 242 engages the reaction piston via an engagement member 260. This engagement member 260 is fitted on the reaction piston 246, slidably at its annular portion 262, and is forced against the retaining ring 94 by the spring 96. The annular portion 262 has a pair of opposed engagement pins 264 extending coaxially from two diametrically opposite positions on the outer circumferential surface. The engagement pins 264 the engagement holes 254 of the lever 242. Parts of the lever 242 rearward of the engagement holes 254 are outwardly bent such that the intermediate portion of each side plate of the lever 242 is stepped as indicated in FIG. 7. Namely, the engagement hole 254 is formed in the stepped intermediate portion, so that the corresponding engagement pin 264 can be brought into engagement with the hole 254 by moving the pin 264 in the direction indicated by arrow in FIG. 7.

The engagement member 260 serves as a component of a device for preventing an abrupt increase in the operating stroke of the brake pedal after the power pressure in the power chamber 38 reaches the upper limit. The power piston 244 continues to be advanced relative to the reaction piston 246, as long as the power pressure increases in proportion to an increase in the operating force exerted to the brake pedal. While the power piston 244 and the reaction piston 246 are both advanced during an operation of the hydraulic booster 10, the lever 242 is pivoted about the point of contact between the abutment tabs 252 and the shoulder face 258. Due to this pivoting movement, the engagement notches 250 are moved in the axial direction of the power piston 244, by a distance greater than that of the engagement holes 254. This means that the power piston 244 is advanced by an accordingly greater distance than the reaction piston 246. If the brake pedal is further depressed after the power pressure reaches the upper limit, the reaction force of the presser piston 50 overcomes an advancing force of the power piston 244 produced by the power pressure, whereby the power piston 244 is retracted. If no provisions are made, the braking pressure in the pressure chamber 52 cannot be raised with an increase in the operating stroke of the brake pedal, until the reaction piston 246 comes into abutment on the power piston 244. Thus, the required operating stroke of the brake pedal is undesirably increased. The device 270 is provided to avoid this phenomenon.

More particularly, the device 270 includes a cylindrical piston 272, which is substantially fluid tightly and slidably received in a blind hole 274 formed in the power piston 244. The piston 272 is forced by a spring 276 against a shoulder face 278 of the reaction piston 246. The three pistons 244, 246 and 272 define a substantially enclosed fluid chamber 280. This fluid chamber 280 communicates with the power chamber 38 through a fluid passage 282 formed through the reaction piston 246. The fluid passage 282 is open at a position just rearward of the annular portion 262 of the engagement member 260 when placed in abutting contact with the retaining ring 94. When the engagement member 260 is moved by a small distance against the biasing force of the spring 96, the opening of the fluid passage 282 is closed by the annular portion 262. That is, the annular portion 262 functions as a valving member of a shut-off valve.

As indicated above, the volume of the fluid chamber 280 increases while the power piston 244 is advanced relative to the reaction piston 246. Since the fluid passage 282 communicates with the power chamber 38 in this condition, the fluid flows into the fluid chamber 280, whereby the advancing movement of the power piston 244 relative to the reaction piston 246 is allowed. When the power pressure reaches the upper limit and the power piston 244 starts to be retracted relative to the reaction piston 246, the engagement member 260 is retracted by means of the lever 242, and the annular portion 262 of the engagement member 260 closes the fluid passage 282 and traps the fluid in the fluid chamber 280, thereby preventing the power piston 244 from being retracted relative to the reaction piston 246. Thus, the device 270 serves to avoid an increase in the operating stroke of the brake pedal when the power pressure reaches the upper limit.

In the other aspects, the present embodiment is different from the preceding embodiment, in that the retracted position of the spool 248 of the control valve 230 is determined by an abutting contact of the lever 242 with a stopper protrusion 286 provided on the housing 32, and in that a return spring 288 for the power piston 244 is disposed outside the housing 32.

Figure 8:
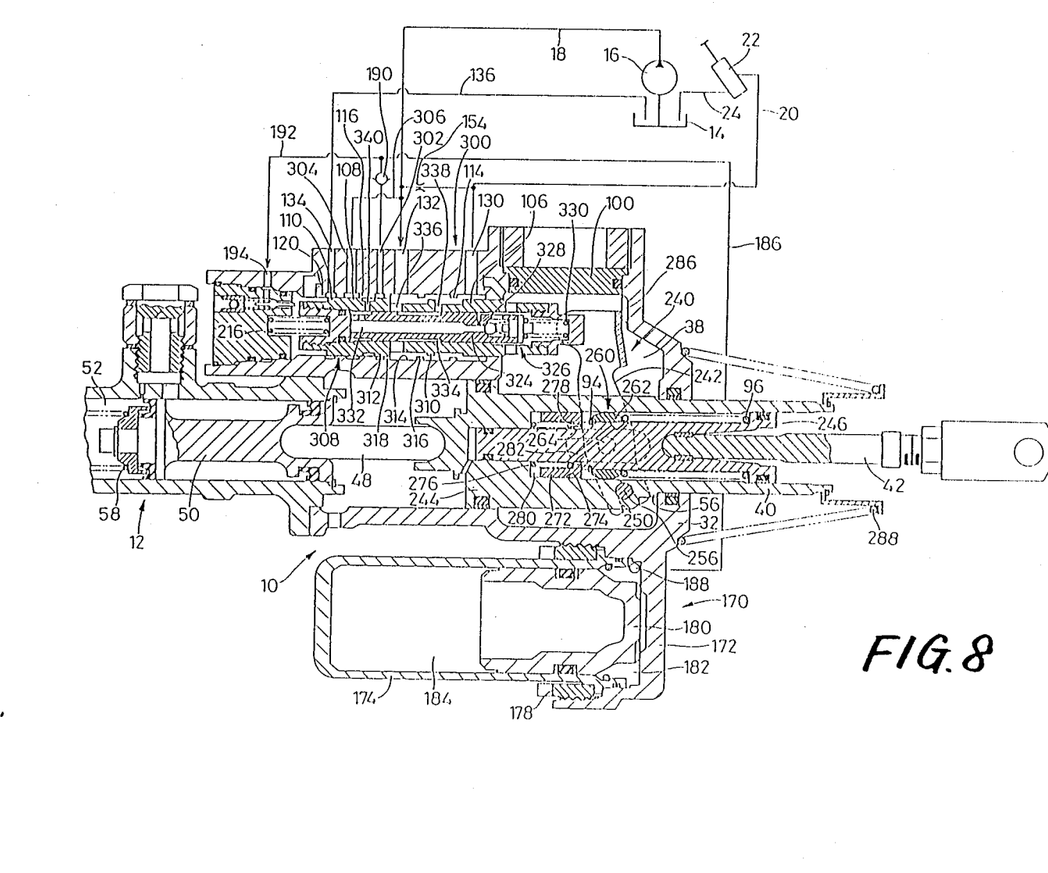
FIG. 8 is a front elevational view in cross section of a further embodiment of the hydraulic booster according to the invention.

Referring to FIG. 8, a further embodiment of the present invention will be described. The instant embodiment is different from the preceding embodiment of FIG. 4, in connection with the control valve.

The control valve 300 of the present embodiment has a port 302 connected to the accumulator passage 186 leading to the accumulator 170, and a port 304 provided as an inlet of the fluid leading to the power chamber 38, in addition to the ports 130, 132, 134 and 194 which are also provided in the control valve 230 of the above embodiment. To the port 304, there is connected a fluid passage 306 which is branched from the fluid passage 18. The spool 308 is formed with a land 310 and a land 312, in addition to the lands 106, 108 and 110 which are also provided on the spool 248 of the preceding embodiment. The inner surface defining the valve bore 314 has a land 316 and a land 318 which correspond to the lands 310 and 312 of the spool 308. The clearances between the corresponding lands and the overlap amounts of the corresponding lands when the spool 308 is in the retracted position are determined so as to satisfy the following inequalities:

$$L1 \geqq L2 > L3, L4 > L5$$

where,
L1: Clearance between the lands 106 and 114
L2: Clearance between the lands 310 and 316
L3: Overlap amounts of the lands 312 and 318
L4: Overlap amount of the lands 108 and 116
L5: Clearance between the lands 110 and 120

An auxiliary spool 324 is fluid tightly and slidably fitted in the spool 308 (which is hereinafter referred to as "primary spool", as distinguished from the auxiliary spool 324). This auxiliary spool 324 is provided with a pressure reducing valve 326 and a small-diameter hole 328, which correspond to the pressure reducing valve and small-diameter hole 234 and 232 provided in the preceding embodiment of FIG. 4. As in the preceding embodiment, the primary spool 308 is biased by the spring 216 toward its retracted position, i.e., in the rightward direction as seen in FIG. 8, while on the other hand the auxiliary spool 324 is biased by a spring 330 in the leftward direction. The auxiliary spool 324 has a power chamber passage 332 and an annular groove 334. Two communication holes 336, 338 formed in the primary spool 308 are normally held in communication with each other through the annular groove 334. When the auxiliary spool 324 is moved to the right against the biasing action of the spring 330, the two communication holes 336, 338 are disconnected from each other. On the other hand, the power chamber passage 332 is always held in communication with a communication hole 340 formed in the primary spool 308.

Normally, the working fluid delivered from the pump 16 to the port 132 is directed to the clearance between the lands 106 and 114, through the clearance between the lands 310, 316 and through the annular groove 334. The fluid is then fed from the port 130 into the fluid passage 20. In this condition, the fluid is circulated through the system, without substantially no flow resistance.

As the brake pedal is depressed, the primary spool 308 is moved to the left. As a result, the lands 110 and 120 first contact each other, to disconnect the power chamber passage 332 from the reservoir 14. Then, the lands 108 and 116 are spaced apart from each other, to bring the power chamber 38 into communication with the pump 16. At the same time, the lands 312 and 318 are spaced apart from each other, whereby the port 132 is brought into communication with the port 302, and the accumulator passage 186 is connected to the pump 16. In this condition, the lands 106 and 114 approach each other, giving a resistance to a flow of the fluid from the port 132 to the port 130. Accordingly, the fluid pressure in the port 132 is raised. While the fluid is fed into the power chamber 38 through the port 304 and power chamber passage 332, the fluid pressures in the power chamber passage 332 and ports 304, 132 are higher than that in the power chamber 38, by an amount equal to a predetermined pressure reducing value of the pressure reducing valve 326 disposed in the power chamber passage 332. Hence, the auxiliary spool 324 is moved to the right against the biasing force of the spring 330, so that the annular groove 334 disconnects the communication holes 336 and 338 from each other. Consequently, the fluid flowing from the port 132 to the port 130 is given a flow resistance by the lands 310 and 316, as well as a flow resistance by the lands 106 and 114. In this condition, the fluid pressures in the port 132 and the communicating portions of the system can be more effectively raised.

When the thus raised fluid pressure exceeds the fluid pressure in the accumulator 170, the fluid whose pressure is raised by the control valve 300 is fed into the accumulator 170 via the check valve 190 and accumulator passage 186.

When the power piston 244 is substantially stopped and there exists substantially no flow of the fluid into the power chamber 38, the fluid pressures in the power chamber passage 332 and the power chamber 38 are equalized in the presence of the small-diameter hole 328, whereby the auxiliary spool 324 is returned to its original position under the biasing force of the spring 330. As a result, the annular groove 334 is restored to its position for communication between the communication holes 336, 338. In this condition, the fluid flows from the port 132 to the port 130 through the clearance between the lands 106, 114, but without passing the clearance between the lands 310 and 316. Thus, the flow resistance is given only by the lands 106, 114, and the fluid pressure in the port 132 is therefore lowered, so that the load applied to the pump 16 is reduced.

As described above, the present modified embodiment assures the reduction of the load of the pump 16, after the movement of the power piston 244 is stopped upon termination of a depressing action of the brake pedal.

In the illustrated embodiment of FIG. 8, the overlap amount of the lands 312 and 318 is equal to that of the lands 108 and 116, so that the amounts of supply of the fluid to the accumulator 170 and the power chamber 38 are the same. However, the ratio of the amounts of fluid supply to the accumulator and power chamber 170, 38 may be selected as needed, by changing the ratio of the overlap amounts of the two pairs of lands 312, 218, and 108, 116. For instance, the amount of supply to the accumulator 170 may be made smaller than that to the power chamber 38, if the overlap amount of the lands 312, 318 is greater than that of the lands 108, 116.

In the illustrated embodiments, the pressure reducing valve adapted to be opened and closed based on a predetermined critical pressure level is used as pressure reducing means for reducing the pressure of the working fluid supplied to the power chamber. This pressure reducing valve is operated in combination with the small-diameter hole, so that there exists substantially no pressure differential on the upstream and downstream sides of the pressure reducing valve, while the rate of flow of the fluid into the power chamber is lower than a predetermined limit. That is, the provision of the small-diameter hole is effective to avoid an unuseful consumption of energy due to holding of the delivery pressure of the pump 16 at a higher level than the required fluid pressure level of the power chamber 38, after the brake pedal depression is ceased. However, the small-diameter hole may be eliminated.

It is also possible to provide the power chamber passage with a suitable restrictor such as a throttle or orifice, so that such a restrictor may serve as pressure reducing means. In this case, the area of fluid flow through the restrictor is determined such that the restrictor functions to reduce the fluid pressure while the rate of fluid flow into the power chamber is relatively high during an advancing movement of the power piston, and such that the restrictor provides substantially no pressure reducing function when the rate of fluid flow through the power chamber passage is considerably low with the power piston almost stopped.

While the present invention has been described in the presently preferred embodiments with a certain degree of particularity and some possible modifications, it is to be understood that the invention is not limited to the details of the illustrated embodiments, but the invention may be embodied with various other changes, modifications and improvements, which may occur to those skilled in the art, in the light of the foregoing teachings, without departing from the spirit and scope of the invention defined in the following claims.

What is claimed is:

1. A hydraulic booster equipped with an emergency accumulator, comprising:

a housing;

a reaction piston and a power piston which are fluid tightly and slidably fitted in said housing, such that said reaction and power pistons cooperate with said housing to define a power chamber;

a control valve having a normally closed power chamber passage formed therethrough so as to communicate with said power chamber, and a normally open passage connecting a pump and a reservoir, said control valve being operated in response to an operation of said reaction piston, so as to restrict a flow of a working fluid through said normally open passage from said pump toward said reservoir, thereby raising a pressure of said working fluid delivered from said pump, and open power chamber passage to apply the raised pressure of the fluid to said power chamber;

pressure reducing means provided in said power chamber passage, for reducing a pressure of the fluid in said power chamber passage and applying the thus reduced pressure to said power chamber, at least while a rate of flow of the fluid through said power chamber passage is higher than a predetermined limit; and an accumulator connected as said emergency accumulator between said pressure reducing means and said pump, for storing a portion of the working fluid whose pressure is raised by said control valve, and supplying said power chamber with the stored working fluid, in the event of a failure where a pressurized working fluid cannot be fed from said pump.

2. A hydraulic booster according to claim 1, wherein said control valve is a spool valve which has a spool, and said power chamber passage includes a communication passage formed within said spool, said pressure reducing means being disposed in said communication passage.

3. A hydraulic booster according to claim 1, wherein said pressure reducing means comprises a pressure reducing valve which inhibits a flow of the working fluid therethrough when a pressure differential across said valve is smaller than a predetermined value, and which permits said flow of the fluid therethrough when said pressure differential is greater than said predetermined value.

4. A hydraulic booster according to claim 3, wherein said pressure reducing means further comprises means for defining a restricted passage provided in parallel to said pressure reducing valve, said restricted passage producing a pressure differential greater than said predetermined value, between opposite ends thereof, during at least a part of an operating period of the hydraulic booster.

5. A hydraulic booster according to claim 4, wherein said pressure reducing means further comprises a check valve connected in series with said restricted passage, said check valve permitting a flow of the fluid in a direction toward said power chamber and inhibiting a flow of the fluid in a direction opposite to said direction, while said pressure reducing valve inhibiting a flow of the fluid from said power chamber.

6. A hydraulic booster according to claim 4, wherein said pressure reducing valve includes a valve member which is biased toward a closed position thereof in which said power chamber passage is closed by said valve member, said valve member having said restricted passage.

7. A hydraulic booster according to claim 1, wherein said control valve is a spool valve which has a spool, said hydraulic booster further comprising a normally closed shut-off valve which is opened by said spool when said spool is moved by a distance greater than normal due to the absence of a flow of the fluid into said power chamber even where said spool has opened said power chamber passage, said stored working fluid being supplied from said accumulator to said power chamber through said shut-off valve.

8. A hydraulic booster according to claim 7, further comprising a damper disposed opposite to one of opposite ends of said spool, said damper normally preventing said spool to be moved to a valve opening position in which said shut-off valve is opened by said spool, said damper permitting said spool to be moved to said valve opening position where said spool acts on said damper for a time span longer than normal.

9. A hydraulic booster according to claim 1, wherein said pressure reducing means comprises a restrictor disposed in said power chamber passage.

10. A hydraulic booster according to claim 1, wherein said control valve includes:

a primary spool having an upstream and a downstream land for restricting a flow of the working fluid through said normally open passage, at respective upstream and downstream positions, an auxiliary spool bore formed axially therethrough, and two by-pass passages for fluid communication of said auxiliary spool bore with respective upstream and downstream sides of one of said upstream and downstream lands; and an auxiliary spool fitted in said auxiliary spool bore, and biased by a spring so as to be normally held in a by-pass position thereof in which said two by-pass passages communicate with each other to permit a flow of the fluid from said pump toward said reservoir while by-passing said one of the upstream and downstrean lands, said auxiliary spool being moved against a biasing action of said spring from said by-pass position to a restricting position thereof, due to a pressure difference between fluid pressures on opposite sides of said pressure reducing means, said auxiliary spool placed in said restricting position disconnecting the communication between said two by-pass passages, and causing also said one of the upstream and downstream lands to restrict the fluid flow through said normally open passage.

11. A hydraulic booster according to claim 1, wherein said power piston is formed with a rear support portion extending from a rear end face thereof, said reaction piston being fluid tightly and slidably received in said rear support portion, said reaction piston having a first pair of engagement grooves formed in an outer circumferential surface thereof, said rear support portion of said power piston having a pair of openings alinged with said first pair of engagement grooves, respectively, said rear support portion further having a second pair of engagement grooves which are formed in spaced-apart relation with said first pair of engagement grooves, said control valve having a spool which includes an end portion projecting into said power chamber, said end portion having a third pair of engagement grooves, one of said first, second and third pairs of engagement grooves being formed in an axial direction of said reaction piston, while the other two pairs of said first, second and third pairs of engagement grooves being formed in a direction perpendicular to said axial direction, said hydraulic booster further comprising a lever which includes a pair of opposed, generally elongate side plates, and a connecting portion connecting said opposed side plates, said pair of opposed side plates having a first pair of engagement pins formed on a pair of opposed inner surfaces thereof so as to extend coaxially toward each other, a second pair of engagement pins formed on said opposed inner surfaces so as to extend coaxially toward each other, and a third pair of engagement pins formed on said opposed inner surfaces so as to extend coaxially toward each other, said first, second and third pairs of engagement pins being spaced apart from each other in an longitudinal direction of said opposed, generally elongate side plates, and being held in engagement with said first, second and third pairs of engagement grooves, respectively, such that said power piston, reaction piston and said spool of said control valve are linked so that said spool is axially moved as a result of an axial movement of said reaction piston relative to said power piston.

12. A hydraulic booster according to claim 1, wherein said power piston is formed with a rear support portion extending from a rear end face thereof, said reaction piston being fluid tightly and slidably received in said rear support portion, said reaction piston having a first pair of engagement pins formed on an outer circumferential surface thereof so as to extend coaxially in opposite directions perpendicular to an axial direction thereof, through respective openings which are formed through a wall thickness of said rear support portion of said power piston, said rear support portion of said power piston having a second pair of engagement pins formed on an outer circumferential surface thereof so as to extend coaxially in opposite directions perpendicular to said axial direction of said reaction piston, said second pair of engagement pins being parallel to said first pair of engagement pins and spaced apart from said first pair of engagement pins in a direction perpendicular to said axial direction, said hydraulic booster further comprising a lever which includes a pair of opposed, generally elongate side plates, and a connecting portion connecting said opposed side plates, said pair of opposed, generally elongate side plates having a first pair of engagement grooves in a longitudinally intermediate portion thereof, and a second pair of engagement grooves each formed at one of opposite ends of said lever, one of said first and second pairs of engagement grooves being formed in a longitudinal direction of said generally elongate side plates, while the other of said first and second pairs of being formed in a lateral direction substantially perpendicular to said longitudinal direction, said first pair of engagement pins of said reaction pistons engaging said first pair of engagement grooves of said lever, while said second pair of engagement pins of said rear support portion of said power piston engaging said second pair of engagement grooves, the other end of said level engaging a spool of said control valve.

* * * * *